(12) United States Patent
Kirchberger

(10) Patent No.: US 8,100,610 B2
(45) Date of Patent: Jan. 24, 2012

(54) INDEXABLE INSERT FOR MILLING TOOLS

(75) Inventor: Peter Kirchberger, Haag (AT)

(73) Assignee: Boehlerit GmbH & Co. KG., Kapfenberg (AT)

( * ) Notice: Subject to any disclaimer, the term of this patent is extended or adjusted under 35 U.S.C. 154(b) by 652 days.

(21) Appl. No.: 12/280,859

(22) PCT Filed: Feb. 12, 2007

(86) PCT No.: PCT/AT2007/000069
§ 371 (c)(1), (2), (4) Date: Aug. 27, 2008

(87) PCT Pub. No.: WO2007/101281
PCT Pub. Date: Sep. 13, 2007

(65) Prior Publication Data
US 2009/0047078 A1    Feb. 19, 2009

(30) Foreign Application Priority Data

Mar. 7, 2006 (AT) ................................ A 379/2006

(51) Int. Cl.
*B23C 5/20* (2006.01)
*B23B 27/22* (2006.01)

(52) U.S. Cl. .......................................... 407/48; 407/103

(58) Field of Classification Search .................... 407/40, 407/43, 48, 113, 114, 115, 116, 103
See application file for complete search history.

(56) References Cited

U.S. PATENT DOCUMENTS

| 4,074,949 | A | 2/1978 | Hochmuth et al. |
| 5,071,291 | A | 12/1991 | Kaminski |
| 5,193,946 | A | 3/1993 | Arai et al. |
| 5,199,827 | A * | 4/1993 | Pantzar .......................... 407/42 |
| 6,196,770 | B1 * | 3/2001 | Astrom et al. .................. 407/40 |
| 6,227,772 | B1 * | 5/2001 | Heinloth et al. .............. 407/113 |
| 6,374,472 | B1 | 4/2002 | Ramold et al. |
| 6,921,233 | B2 * | 7/2005 | Duerr et al. ..................... 407/34 |
| 7,073,987 | B2 * | 7/2006 | Hecht ............................. 407/113 |
| 7,147,407 | B2 * | 12/2006 | Satran ............................. 407/42 |

(Continued)

FOREIGN PATENT DOCUMENTS

DE    1 602 795    4/1970

(Continued)

OTHER PUBLICATIONS

Korean Office Action dated Aug. 18, 2010 that issued with respect to Korean Patent Application No. 7016205/2008, along with an English language translation thereof.

*Primary Examiner* — Will Fridie, Jr.
(74) *Attorney, Agent, or Firm* — Greenblum & Bernstein, P.L.C.

(57) ABSTRACT

An indexable insert for a milling tool that includes at least one mounting surface having a through bore for fixing the insert to a rotatable tool, a rounded cutting edge defined by at least one cutting face and a lateral surface, and the at least one cutting face being arranged on a lateral side of the insert and extending from a base. The base is angled with respect to the at least one mounting surface. This abstract is not intended to define the invention disclosed in the specification, nor intended to limit the scope of the invention in any way.

28 Claims, 2 Drawing Sheets

U.S. PATENT DOCUMENTS

| | | |
|---|---|---|
| 2003/0170080 A1 | 9/2003 | Hecht |
| 2005/0063792 A1 | 3/2005 | Satran |
| 2005/0169716 A1 | 8/2005 | Smilovici et al. |
| 2006/0210365 A1 | 9/2006 | Hecht |

FOREIGN PATENT DOCUMENTS

| | | |
|---|---|---|
| DE | 2 164 093 | 7/1973 |
| DE | 196 26 608 | 1/1998 |
| DE | 299 12 025 | 9/1999 |
| EP | 0502541 | 9/1992 |
| EP | 0 830 228 | 3/1998 |
| JP | 55-055313 | 4/1980 |
| JP | 09-136210 | 5/1997 |
| JP | 2005-518949 | 6/2005 |
| KR | 2005-34198 | 4/2005 |
| RU | 2 284 249 | 9/2006 |
| WO | WO 96/39269 | 12/1996 |
| WO | 98/03747 | 8/1998 |
| WO | 03/074218 | 9/2003 |
| WO | 2005/005084 | 1/2005 |
| WO | 2005/0218149 | 3/2005 |
| WO | WO 2006/128410 | 12/2006 |

\* cited by examiner

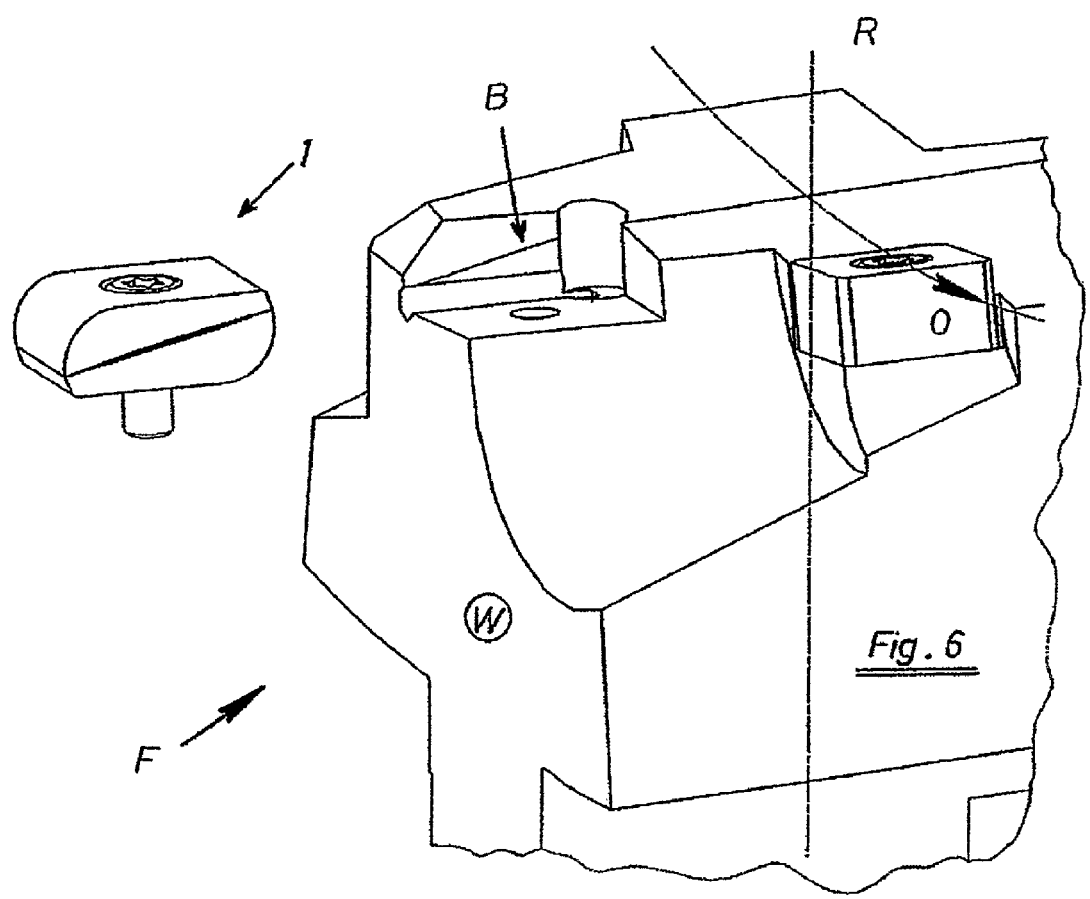

INDEXABLE INSERT FOR MILLING TOOLS

CROSS-REFERENCE TO RELATED APPLICATIONS

The present application is a U.S. National Stage of International Patent Application No. PCT/AT2007/000069 filed Feb. 12, 2007 which published as WO 2007/101281 on Sep. 13, 2007, and claims priority of Austrian Patent Application No. A 379/2006 filed Mar. 7, 2006.

BACKGROUND OF THE INVENTION

1. Field of the Invention

The invention relates to an indexable insert for a milling tool.

The invention relates to an indexable insert for a milling tool for machining crankshafts or camshafts wherein the insert includes at least one mounting surface having a bore for fixing the insert to a rotatable tool part and at least one cutting face forming cutting edges with the lateral surfaces.

Furthermore, the invention relates to a milling tool, in particular, a milling tool for machining crankshafts or camshafts.

2. Discussion of Background Information

Inserts for milling tools, in particular, milling tools for machining crankshafts, generally have a wedge angle of 90°, i.e., the angle on the cutting edge from the side face to the cutting face of the insert. When installed in the milling tool, the cutting angle of the insert is negative and has a value of approx. −8° to −12°. Such an arrangement is known in the art as "negative (insert) geometry."

In use, the milling tool that utilizes a wedge angle of 90° produces a high edge-holding ability of the insert. However, the negative geometry causes strong cutting forces during cutting.

Furthermore, strong cutting forces on the milling tool subject the transmission drive of the milling cutter to high loads. However, this arrangement must be free from play and may not permit any chatter vibrations at all.

A reduction of the cutting forces acting on an insert and thus a reduction in the load on the milling cutter drive can be achieved, as one skilled in the art is aware, utilizing a so-called positive geometry of the cutting edge. With a cutting angle of less than 90°, a wedge angle of the insert on the cutting edge of 82° to 70° should be provided.

Attempts have been made to use indexable inserts utilizing a cutting cavity recessed from the cutting edge on all sides, and in this manner to create a positive geometry of the cutting edge of the milling tool. Although this geometry of the cutting edge of the insert can largely meet the expectations with respect to a reduction of the cutting forces, and thus cause a reduction of the load on the tool drive (working free from play), it has the disadvantage of being more complicated to produce, has a low cutting edge-holding ability and has an insert geometry associated with high dimensional tolerances and uneven or unmachined sintered bearing surfaces.

SUMMARY OF THE INVENTION

The invention relates to an indexable insert for a milling tool of the type mentioned at the outset, which causes a high chip removal and with reduced cutting forces in the tool, in particular, when used in the machining of crankshafts. The insert also has a largely positive geometry of the cutting edge, reduces the cutting pressure on the cutting faces in the area of the cutting edge, has a high manufacturing accuracy and ensures high cost effectiveness as well as insert quality in terms of manufacturing technology.

Furthermore, the invention relates to a milling tool which runs smoothly with reduced drive power consumption at a high cutting capacity.

The invention also provides for an indexable insert that has a centrically symmetrical cutting edge contour on at least one side, wherein, in plan view, the cutting face has a concave wedge shape or trough shape utilizing an angle "$\alpha$" of the wedge base or trough base is defined relative to the mounting surface and, on the opening side of the angle "$\alpha$", the cutting edge formed by the mounting surface (or the lateral surface) and the cutting face is rounded.

The advantages attained with the invention are essentially that the cutting edge contour is adjusted to the criteria of a high chip removal during milling and for an indexing of the insert. The cutting face is thereby embodied such that, on the one hand, a desired geometry of the cutting edge is realized, and, on the other hand, can guarantee a secure non-displaceable support of the insert. In order to create a cutting contour shape that is favorable for milling, curvatures are provided on two corners lying opposite one another. A wedge angle, that is necessary for a positive geometry in the round areas of the insert, is obtained through an angular position of the concave cutting face base relative to the mounting surface.

According to a preferred embodiment of an insert according to the invention, the wedge angle "$\kappa$" (kappa) of the cutting edge, which is measured perpendicular to the wedge base or trough base, is between 50° and 85°.

A wedge angle of this type permits an advantageous positioning of the insert in the milling cutter and provides a high cutting edge-holding ability or a low risk of cutting edge chips in the highly stressed zones.

If, as can be advantageously provided, the insert has cutting faces which are identically spaced apart and identically shaped on both sides, based on the through bore, an indexing of the insert is possible so as to provide a total of four new cutting areas.

An embodiment of an indexable insert according to the invention, that is favorable in terms of production technology and excellent, in particular, for chip formation, can be obtained in that the cutting face has perpendicular on the wedge or trough base a flat wedge shape or a trough shape with a straight-line generatrix and is produced by machining, e.g., by grinding.

A chip flowing off from the cutting edge on the cutting face is subjected thereby to only a low pressure against the travel direction caused by a bending, so that wear and thermal loading are minimized. Furthermore, when the dimensional variations of the inserts are kept small and smooth cutting faces are created, the flow of chips occurs in a favorable manner during machining.

The invention also provides for a milling tool in that indexable inserts according to the above descriptions are arranged on at least one side of an essentially disk-shaped tool body such that their cutting angle has a value of zero or greater than zero.

The advantages attained with a milling tool according to the invention are essentially that the indexable insert is installed in a simple manner such that a positive geometry of the cutting edge is utilized in the areas where the greatest chip removal takes place. This has advantages, in particular, by providing an efficient cutting with low cutting pressure and chatter-free with reduced power.

Advantageously, the milling tool is embodied in an embodiment of the invention such that the cutting angle is no more than 20°, and preferably no more than 15°.

In this manner, fractures of the cutting edge can be effectively avoided.

The invention also provides for an indexable insert for a milling tool, which includes at least one mounting surface having a through bore for fixing the insert to a rotatable tool, a rounded cutting edge defined by at least one cutting face and a lateral surface, and the at least one cutting face being arranged on a lateral side of the insert and extending from a base. The base is angled with respect to the at least one mounting surface.

The insert may be structured and arranged to machine one of crankshafts and camshafts and the rounded cutting edge comprises a centrically symmetrical cutting edge contour. The at least one cutting face may comprise two cutting faces extending from the base. The two cutting faces may be one of concave wedge-shaped and concave trough shaped. The lateral side may comprise two oppositely arranged lateral sides each comprising one base and two cutting faces. The insert may comprise four rounded cutting edges. The at least one cutting face may comprise two cutting faces extending from the base and defining an angle that is obtuse. The at least one cutting face may comprise two flat cutting faces extending from the base and defining an angle that is obtuse. The base may form an acute angle with respect to the at least one mounting surface. The rounded cutting edge may be defined as a vertex of a wedge angle. The wedge angle may be an acute angle. The wedge angle may be between 50° and 85°. The insert may comprise four cutting faces which are identically spaced apart and identically shaped on each of two lateral sides. The at least one cutting face may be flat and the base may extend along a straight line. The at least one cutting face may be flat and may be structured and arranged to be formed by one of machining and grinding.

The invention also provides for a method of making the insert described above, wherein the method comprises machining the insert to form four rounded cutting edges, two lateral sides each having two cutting faces and a base, front and back sides, and two oppositely arranged mounting surfaces.

The invention also provides for a milling tool comprising at least one insert described above arranged on a body and defining a cutting angle that is zero or greater than zero.

The cutting angle may be one of no more than 20° and no more than 15°.

The invention also provides for an indexable insert for a milling tool, which comprises two oppositely arranged mounting surfaces, a through bore extending between the two oppositely arranged mounting surfaces, two oppositely arranged lateral sides, each lateral side comprising two cutting faces and a base extending a long a straight line, and each base forms an acute angle with respect to one of the mounting surfaces. The insert comprises four rounded cutting edges.

Each rounded cutting edge may be defined as a vertex of an acute wedge angle.

The invention also provides for an indexable insert for a milling tool, which comprises two oppositely arranged mounting surfaces defining a thickness of the insert, a through bore extending between the two oppositely arranged mounting surfaces, oppositely arranged front and back surfaces defining a length of the insert that is greater than the thickness, two oppositely arranged lateral sides defining a width of the insert, each lateral side comprising two cutting faces and a base extending a long a straight line, and each base forms an acute angle with respect to one of the mounting surfaces. The insert further comprises four rounded cutting edges such that two oppositely arranged cutting edges are defined by the first side, two oppositely arranged cutting faces, and one of the two mounting surfaces and such that two other oppositely arranged cutting edges are defined by the back side, two other oppositely arranged cutting faces, and another of the two mounting surfaces.

BRIEF DESCRIPTION OF THE DRAWINGS

The invention is described in more detail below based on drawings showing an embodiment of the invention, wherein:

FIG. 6 shows a milling tool in section with separated insert.

DETAILED DESCRIPTION OF THE INVENTION

Figure 1:
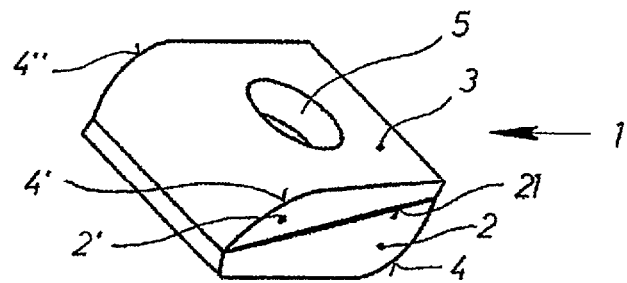
FIG. 1 shows an insert.

FIG. 1 shows an insert 1 having oppositely arranged mounting surfaces 3, 3' for mounting the insert 1 on a tool. A through bore 5 is utilized for attaching the same thereto. The tangential indexable insert 1 according to an embodiment of the invention has on the front thereof a first flat cutting face 2 and a similar second cutting face 2'. These cutting faces 2, 2' form with one another a concave end-face wedge shape and extend from a wedge base 21. The cutting faces 2, 2' and the mounting surfaces 3, 3' of the insert form cutting edges 4, 4', 4", which are curved and are arranged diagonally opposite one another. The wedge base 21 runs in a diagonally opposite manner. In this manner enlarged cutting faces 2, 2' are formed in the curvature region.

Figure 2:
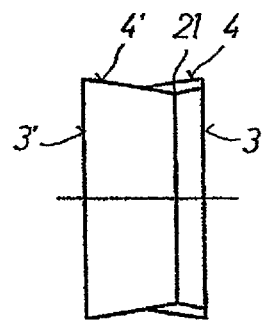
FIG. 2 shows an insert in a view parallel to the mounting surface.

FIG. 2 shows the insert of FIG. 1 along a direction that is parallel to the mounting surfaces 3, 3' (or lateral surfaces). As is apparent from a comparison of FIGS. 1 and 2, the wedge base 21 runs obliquely at an angle to the lateral surfaces 3, 3'. Edge areas of the surfaces 3, 3' together with cutting faces 2, 2' define cutting edges 4, 4'.

Figure 3:
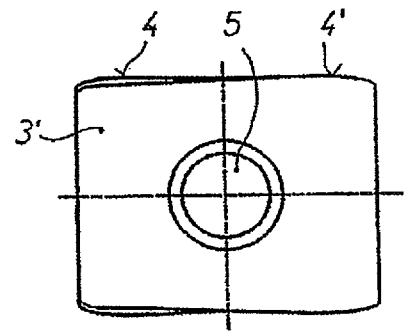
FIG. 3 shows an insert in a view parallel to the bore axis.

FIG. 3 shows the insert 1 according to FIG. 2, but in a view that is rotated by 90° in the direction of the bore 5.

Figure 4:
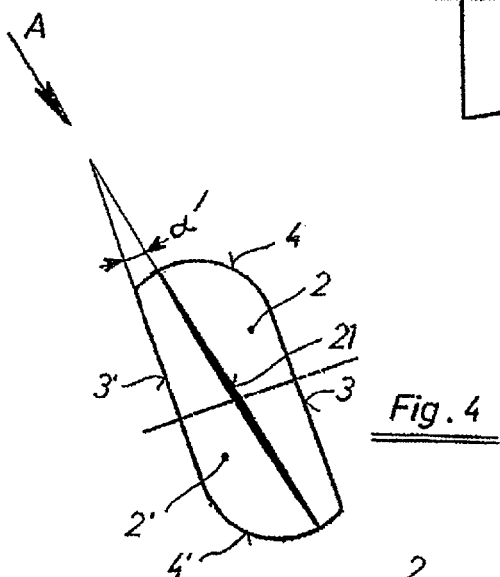
FIG. 4 shows an insert in plan view of the cutting faces.

FIG. 4 shows schematically the insert 1 according to the invention and illustrated in a plan view (parallel to the mounting surfaces) and shows the cutting faces 2, 2' and the wedge base 21 having the angle "a" relative to mounting surface 3'.

Figure 5:
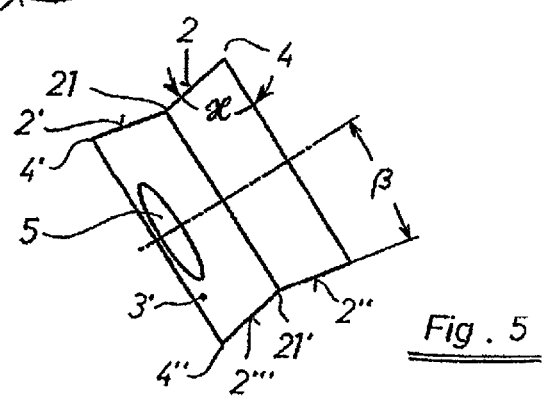
FIG. 5 shows an insert in a view parallel to the cutting faces.

FIG. 5 shows the insert 1 in the view from direction A of FIG. 4 in the direction of the wedge base 21.

The wedge base 21 as noted above, runs at an angle "α" to the flat mounting surface 3' and provides an optionally flat cutting face 2', which is enlarged towards the curvature of the lateral surface. The cutting faces 2, 2' and the cutting edges 4, 4' are thereby embodied in a centrically symmetrical manner. In the plan view of the cutting faces 2, 2' (FIG. 4), the insert 1 has a length of approx. 16 mm and a width (between surfaces 3, 3') of approx. 6.5 mm. The angle "a" can be, for example, approximately 12°.

FIG. 5 shows a concave wedge shape of the cutting faces 2, 2' as well as cutting faces 2", 2''' on opposite sides of the insert 1 and which are equally spaced from the bore 5. These opposite sides respectively form the oppositely arranged wedge bases 21 and 21'. The mounting surfaces (or lateral surfaces) 3, 3' and the cutting faces 2, 2', 2", 2''' form a wedge angle "κ" (kappa) that is perpendicular to the wedge bases 21, 21' and the wedge angle "κ" is defined in relation to the cutting edges 4, 4', 4", 4''' (see FIG. 5).

According to the invention, the cutting face region can also be embodied in a cylindrical or trough-shaped manner (i.e., the surfaces 2, 2' can be inwardly curved instead of flat) with a straight-line generatrix, wherein a different wedge angle "K" optionally results in the curved area of the cutting edges 4, 4', 4", 4'".

FIG. 6 shows a section from a milling tool F, which, perpendicular to the radius R on a tool outer side W, utilizes a recess B receiving therein a separately shown indexable insert 1 according to the invention. The tool movement is labeled by reference 0.

The invention claimed is:

1. An indexable insert for a milling tool, comprising:
   at least one mounting surface having a through bore for fixing the insert to a rotatable tool;
   a rounded cutting edge defined by at least one cutting face; and
   the at least one cutting face being arranged on a lateral side of the insert and extending from a base,
   wherein the base is angled with respect to the at least one mounting surface,
   wherein the at least one cutting face comprises two cutting faces extending from the base, and
   wherein the two cutting faces are one of concave wedge-shaped and concave trough shaped.

2. The insert of claim 1, wherein the lateral side comprises two oppositely arranged lateral sides each comprising one base and two cutting faces.

3. An indexable insert for a milling tool, comprising:
   at least one mounting surface having a through bore for fixing the insert to a rotatable tool;
   a rounded cutting edge defined by at least one cutting face; and
   the at least one cutting face being arranged on a lateral side of the insert and extending from a base
   wherein the base is angled with respect to the at least one mounting surface, and
   wherein the lateral side comprises two oppositely arranged lateral sides each comprising one said base and two said cutting faces.

4. An indexable insert for a milling tool, comprising:
   at least one mounting surface having a through bore for fixing the insert to a rotatable tool;
   a rounded cutting edge defined by at least one cutting face; and
   the at least one cutting face being arranged on a lateral side of the insert and extending from a base,
   wherein the base is angled with respect to the at least one mounting surface, and
   wherein the base forms an acute angle with respect to the at least one mounting surface.

5. The insert of claim 4, wherein the at least one cutting face comprises two cutting faces extending from the base and defining an angle that is obtuse.

6. The insert of claim 4, wherein the at least one cutting face comprises two flat cutting faces extending from the base and defining an angle that is obtuse.

7. The insert of claim 4, wherein the insert comprises four rounded cutting edges.

8. The insert of claim 4, wherein the rounded cutting edge is defined as a vertex of a wedge angle.

9. An indexable insert for a milling tool, comprising:
   at least one mounting surface having a through bore for fixing the insert to a rotatable tool;
   a rounded cutting edge defined by at least one cutting face; and
   the at least one cutting face being arranged on a lateral side of the insert and extending from a base,
   wherein the base is angled with respect to the at least one mounting surface,
   wherein the rounded cutting edge is defined as a vertex of a wedge angle, and
   wherein one of:
   the wedge angle is an acute angle; and
   the wedge angle is between 50° and 85°.

10. An indexable insert for a milling tool, comprising:
    at least one mounting surface having a through bore for fixing the insert to a rotatable tool;
    a rounded cutting edge defined by at least one cutting face; and
    the at least one cutting face being arranged on a lateral side of the insert and extending from a base,
    wherein the base is angled with respect to the at least one mounting surface, and
    wherein the insert comprises four cutting faces which are identically spaced apart and identically shaped on each of two lateral sides.

11. The insert of claim 4, wherein one of:
    the at least one cutting face is flat and the base extends along a straight line; and
    the at least one cutting face is flat and is structured and arranged to be formed by one of machining and grinding.

12. A method of making the insert of claim 4, the method comprising:
    machining the insert to form four rounded cutting edges, two lateral sides each having two cutting faces and a base, front and back sides, and two oppositely arranged mounting surfaces.

13. A milling tool comprising at least one insert recited in claim 4 arranged on a body and defining a cutting angle that is zero or greater than zero.

14. The milling tool of claim 13, wherein the cutting angle is one of:
    no more than 20°; and
    no more than 15°.

15. The insert of claim 4, wherein each rounded cutting edge is defined as a vertex of an acute wedge angle.

16. An indexable insert for a milling tool, comprising:
    two oppositely arranged mounting surfaces defining a thickness of the insert;
    a through bore extending between the two oppositely arranged mounting surfaces;
    oppositely arranged front and back surfaces defining a length of the insert that is greater than the thickness;
    two oppositely arranged lateral sides defining a width of the insert;
    each lateral side comprising two cutting faces and a base extending a long a straight line; and
    each base forming an acute angle with respect to one of the mounting surfaces,
    wherein the insert comprises four rounded cutting edges such that:
    two oppositely arranged cutting edges are arranged between the front side, two oppositely arranged cutting faces, and one of the two mounting surfaces; and
    two other oppositely arranged cutting edges are arranged between the back side, two other oppositely arranged cutting faces, and another of the two mounting surfaces.

17. An indexable insert for a milling tool, comprising:
    first and second oppositely arranged mounting surfaces defining a thickness of the insert;
    a single through bore extending between the first and second oppositely arranged mounting surfaces;

oppositely arranged front and back surfaces defining a length of the insert that is greater than the thickness;
left and right oppositely arranged V-shaped lateral sides defining a width of the insert;
each V-shaped lateral side comprising two cutting faces and a base extending between the front and back surfaces;
an angle between the first mounting surface and one of the cutting faces on the left lateral side forming an acute angle and an angle between the first mounting surface and one of the cutting faces on the right lateral side forming an acute angle;
an angle between the second mounting surface and another of the cutting faces on the right lateral side forming an acute angle and an angle between the second mounting surface and another of the cutting faces on the left lateral side forming an acute angle;
each base forming an acute angle with respect to one of the first and second mounting surfaces when measured parallel to the length;
a first distance between the first mounting surface and an end of the base at the front surface being greater than a second distance between the first mounting surface and an opposite end of the base at the back surface;
wherein the insert utilizes four rounded cutting edges, and
wherein two of the rounded cutting edges are arranged between the front surface and the through opening and two other of the rounded cutting edges are arranged between the back surface and the through opening.

18. The insert of claim 17, wherein the first distance is greater than a distance between the first mounting surface and an imaginary plane parallel to the first mounting surface and centrally arranged between the first and second mounting surfaces.

19. The insert of claim 18, wherein the second distance is less than the distance between the first mounting surface and the imaginary plane.

20. The insert of claim 17, wherein the second distance is greater less than a distance between the first mounting surface and an imaginary plane parallel to the first mounting surface and centrally arranged between the first and second mounting surfaces.

21. An indexable insert for a milling tool, comprising:
first and second oppositely arranged mounting surfaces defining a thickness of the insert;
a through bore extending between the first and second oppositely arranged mounting surfaces;
oppositely arranged front and back ends defining a length of the insert that is greater than the thickness;
left and right oppositely arranged V-shaped lateral sides defining a width of the insert;
the right V-shaped lateral side comprising:
a first surface and a second surface; and
a first base arranged between the first and second surfaces;
the left V-shaped lateral side comprising:
a third surface and a fourth surface; and
a second base arranged between the third and fourth surfaces;
each of the first and second bases extending between the front and back ends;
an angle between the first mounting surface and the first surface forming an acute angle and an angle between the first mounting surface and the third surface forming an acute angle;
an angle between the second mounting surface and the second surface forming an acute angle and an angle between the second mounting surface and the fourth surface forming an acute angle;
each of the first and second bases forming an acute angle with respect to the first mounting surface;
a first distance between the first mounting surface and ends of the first and second bases at the front surface being greater than a second distance between the first mounting surface and opposite ends of the first and second bases at the back surface,
wherein first and second rounded cutting edges are arranged between the front surface and the through bore and third and fourth rounded cutting edges are arranged between the back surface and the through bore.

22. The insert of claim 21, wherein the left and right oppositely arranged V-shaped lateral sides are identically shaped and each rounded cutting edge is an outwardly curved rounded cutting edge.

23. The insert of claim 21, wherein the acute angle formed between each of the first and second bases and the first mounting surface is approximately 12 degrees.

24. The insert of claim 21, wherein the insert utilizes four cutting edge contours and:
a first cutting edge contour includes the first rounded cutting edge and a first edge extending between the first rounded cutting edge and the back end;
a second cutting edge contour includes the second rounded cutting edge and a second edge extending between the second rounded cutting edge and the back end;
a third cutting edge contour includes the third rounded cutting edge and a third edge extending between the third rounded cutting edge and the front end;
a fourth cutting edge contour includes the fourth rounded cutting edge and a fourth edge extending between the fourth rounded cutting edge and the front end;
the first and second edges defining opposite sides of the first mounting surface; and
the third and fourth edges defining opposite sides of the second mounting surface.

25. A method of milling comprising:
mounting the indexable insert of claim 21 on a milling tool.

26. The method of claim 25, further comprising:
milling a crankshaft or a camshaft with the milling tool.

27. The insert of claim 3, wherein the insert is structured and arranged to machine one of crankshafts and camshafts and the rounded cutting edge insert comprises a centrically symmetrical cutting edge contour.

28. The insert of claim 4, wherein the at least one cutting face comprises two cutting faces extending from the base.

* * * * *